Nov. 4, 1969 R. McCARTHY 3,476,569
METHOD OF REMOVING UNDESIRABLE FLAVOR AND SPOILAGE
INFLUENCING SUBSTANCES FROM UNCOOKED MEATS
Filed Oct. 22, 1965 3 Sheets-Sheet 1
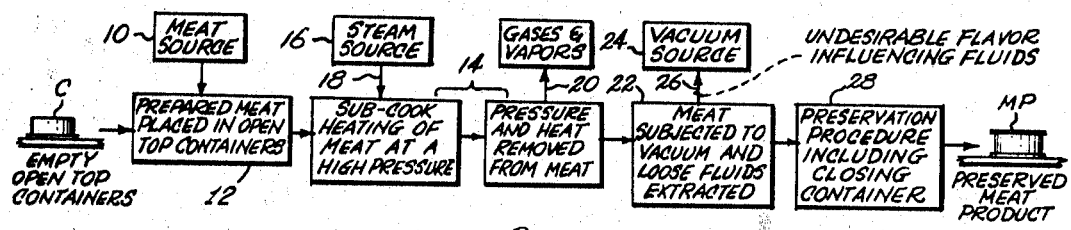
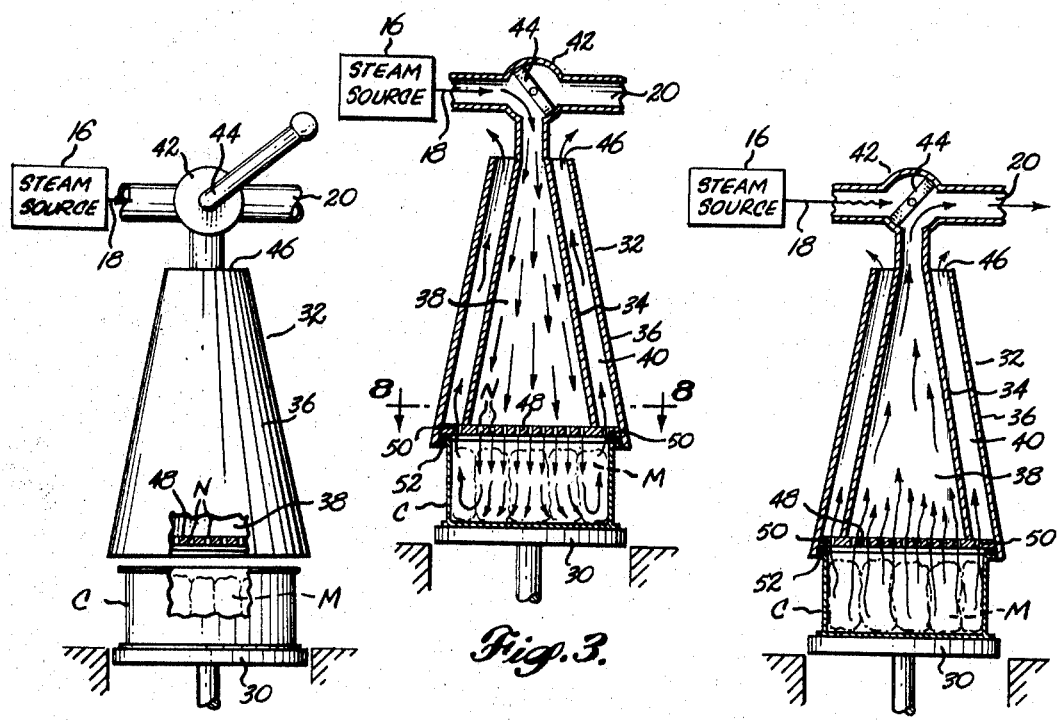
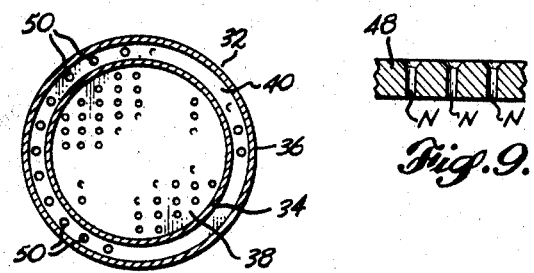
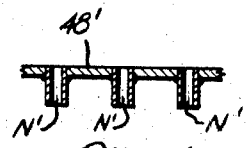
INVENTOR.
ROBERT McCARTHY
BY Graybeal, Cole & Barnard
ATTORNEYS

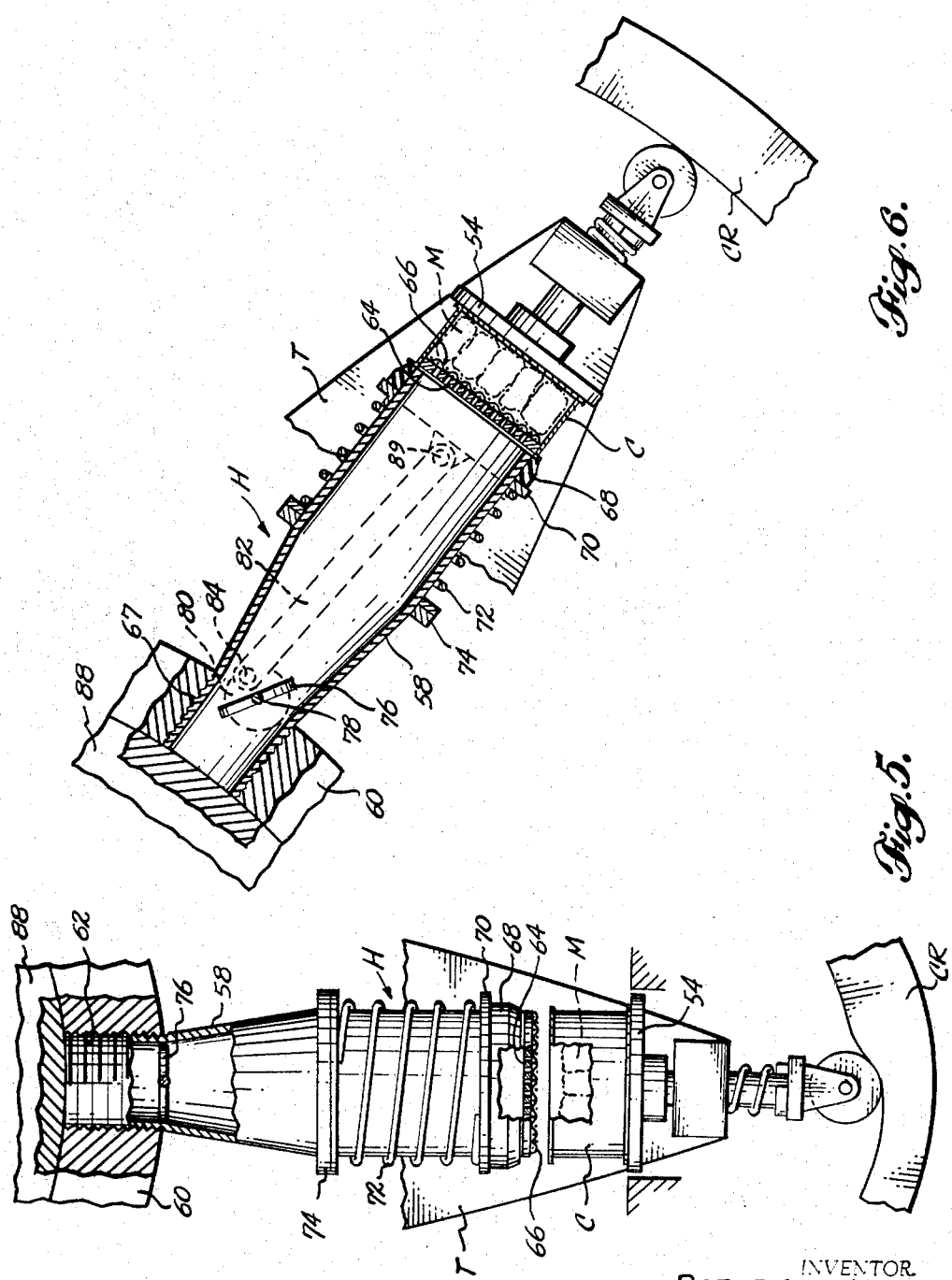

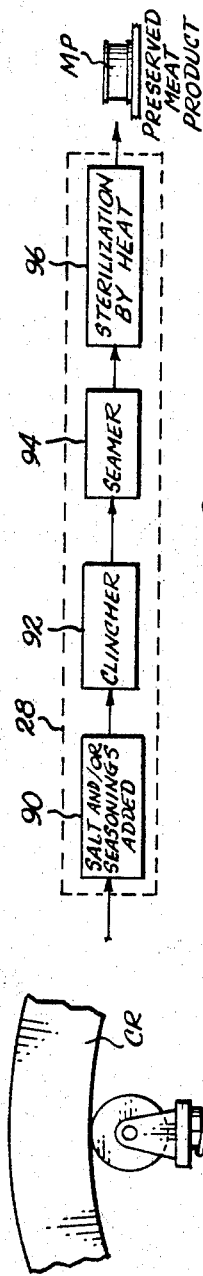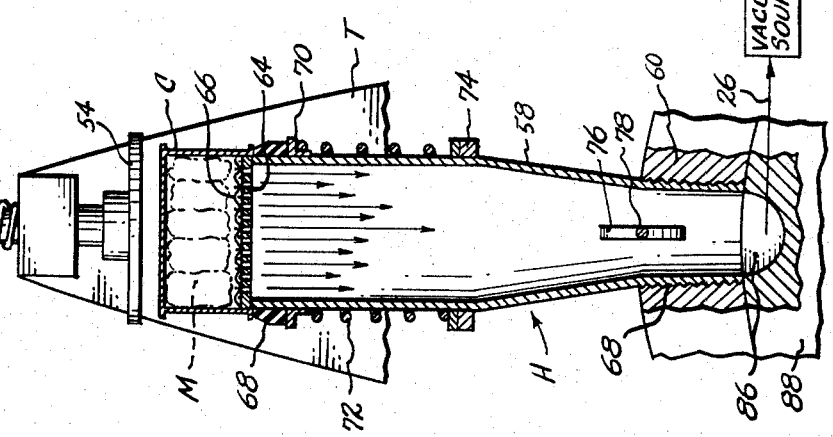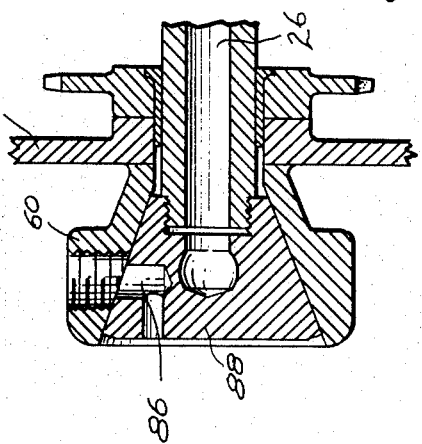

United States Patent Office 3,476,569
Patented Nov. 4, 1969

3,476,569
METHOD OF REMOVING UNDESIRABLE FLAVOR AND SPOILAGE INFLUENCING SUBSTANCES FROM UNCOOKED MEAT
Robert McCarthy, 1314–1 E. Pike, Seattle, Wash. 98122
Filed Oct. 22, 1965, Ser. No. 500,522
Int. Cl. A22c 25/00; A23b 1/00, 3/00
U.S. Cl. 99—107                                14 Claims

ABSTRACT OF THE DISCLOSURE

Pieces of raw meat are placed into containers, are subjected to sub-cook heating and/or pressure, and are then promptly subjected to vacuum extraction, causing removal of melted fats and various enzymic liquescent constituents from the uncooked meat. Next the meat is seasoned and/or preserved in such containers. Steam injection is used to provide both heat and pressure. Microwave heating may be used alone. Ultrasonic energy may be used in place of the heat and/or pressure.

---

The present invention relates to the preservation of edible animal meat for eventual use as food by humans or domesticated animals, and more particularly to a method and apparatus for removing certain flavor and spoilage influencing substances from uncooked animal meat prior to its final preservation, and to meat products prepared by such methods.

All species of animal meat or flesh used as a source of food for humans or domesticated animals contain a liquid and/or fatty constituent, or content, which is sealed in the cells and tissues of the meat and has a determining effect or influence on the spoilage pattern and flavor of the meat. If these substances are not removed from the meat prior to its preservation, they will not only influence the taste and odor of the preserved meat product, but will in some cases affect its general appearance as well.

It is known that the meat of some species of animal cannot be preserved with any degree of success unless these substances are first removed from them. Examples of such species of animals include such fish as halibut, sole, cod, shark, etc., as is discussed more fully in U.S. Patent No. 1,252,865, issued Jan. 8, 1918, to Robert M. Thompson, and also in U.S. Patent No. 2,411,188, issued Nov. 19, 1946, to Edward M. Borg. With respect to the preservation of the species of animals named in these patents, the objects of the present invention encompass the objects expressed in said patents. However, with respect to the manner of achieving these objects, and to the means employed, the method and apparatus provided by the present invention constitute improvements over the methods and apparatus disclosed in the Thompson and Borg patents.

It is to be understood, however, that the principles of the present invention are not limited merely to those species of meat mentioned in the Thompson and Borg patents, and which cannot be successfully preserved unless the flavor and spoilage influencing substances are first removed, but rather relate to nearly all species of edible animal meat. Thus the principles of the present invention also pertain to the varieties of animal meat that are now regularly preserved on a large commercial scale, but by widely differing processes, including but not limited to such fish as tuna and salmon and such red tissue meats as beef, lamb and mutton, for example. Accordingly, a principal object of this invention is to provide a new and commercially practical method of improving the palatability, appearance, and odor, of substantially all species of edible animal meats. The term "animal meat" is used herein to mean any one of the edible species of mammals, fish, birds, reptiles, amphibia, mollusks and crustacea.

Another object of the present invention is to provide a method for the removal of the undesirable flavor and spoilage influencing substances from animal meat prior to final preservation of the same (e.g. by canning, freezing, radiation treatment, etc.), which method is applicable to nearly all species of animal meat, with essentially the only variation in treatment from one type of meat to another involving merely the extent or duration of treatment.

It is another object of the present invention to provide a method of processing uncooked (fresh-killed, thawed or frozen) animal meat prior to canning of the same for the purpose of improving the taste, odor, color, appearance and general overall condition of the preserved meat product. Generally speaking, the method comprises a technique of effecting the rapid and forceful removal of melted fats and various enzymic liquescent constituents, in predetermined amounts, from the cells and interstices of the meat after it has been packed into cans in a raw or uncooked state and before any other ingredients, such as flavorings and/or seasonings, have been added and the cans closed for final cooking and sterilization. The removal of such substances in this manner also has a beneficial effect on the keeping quality of the preserved product and permits the entire canning process to be conducted more rapidly.

In accordance with the present invention, uncooked animal meat which is to be preserved is first cut into pieces and placed into open top containers, and then while in the containers is subjected to a heat and pressure. The amount of heat applied is insufficient to "cook" the meat, according to the commonly accepted meaning of the term. Preferably the heating under pressure is done by injecting high velocity jets of steam through the open top of each container, directly into the meat, while confining at least a portion of the steam and evolved vapors and gases in the container, whereby the pressure builds up in the container to a value substantially above atmospheric pressure. The penetration of the high velocity jets of high temperature steam into the meat is swift and deep, resulting in a fast and efficient heat-transfer. The heat and pressure combine to disrupt the structural balance of the meat tissues, causing the flavor and spoilage influencing substances in the cells and tissues of the meat to boil and at least partially vaporize. The vapors and gases which are produced burst through and tear or otherwise open up the tissues. At least a portion of the flavor and spoilage influencing substances are released from their bonds and made amenable to later removal as loose fluids. After sufficient heating of the meat, the steam injection is discontinued and the steam and evolved vapors and gases confined in the container are released. This lowers the external pressure on the meat down to atmospheric pressure. As an immediate result, liquids still in the cells and tissues of the meat, which are still at super-atmospheric pressure, and are hot, will boil and burst through the meat tissues, as before, further disrupting the structure of tissues and breaking down the resistance which they offer to the removal of the unwanted flavor and spoilage influencing substances. Next, the meat, while it is still hot and has cooled little, if at all, is subjected to a vacuum, preferably by communicating the open top of the container with a vacuum pump. The external pressure on the meat is rather abruptly reduced down to a value substantially below atmospheric pressure. This causes the liquids still in and about the cells and tissues of the meat which are at or slightly above atmospheric pressure, and are still hot, to boil and burst through the tissues, as before, causing an additional breakdown of the tissues. At this stage, substantially all the unwanted flavor and spoilage influencing substances are present in the container as loose liquids and/or free gases and vapors (hereinafter sometimes more simply termed "loose fluids"), or have previously left the container as free vapors or gases. The remaining loose liquids and free vapors and gases are then extracted from the container and its contents, preferably by at least partially inverting the container while its open top is still in communication with the source of vacuum. Finally the meat product is preserved such as by canning, freezing, radiation treatment, etc.

Another principal object and feature of the present invention is to provide a mechanism for heating meat packed in open top containers, said mechanism comprising a steam injection head having a central steam chamber with inlet and outlet ends, conduit means for delivering steam into said chamber through the inlet end, and a nozzle plate extending across the outlet end of said steam chamber and including a plurality of steam jet forming nozzles; means supporting an open top container of uncooked animal meat in registry with said nozzle plate, whereby the high velocity jets of high temperature steam may penetrate swiftly and deeply into the meat, so as to effect a fast and efficient heat-transfer. The nozzle plate is preferably provided with a fluid seal of rubber or rubber-like material in sealing engagement with the rim or lip of the open top container. During use of the mechanism the nozzle plate serves to confine in the container at least a portion of the steam and the vapors and gases which are evolved from the meat as a result of the heating, so that the heating is conducted at super-atmospheric pressure, as previously mentioned. Preferably the annular peripheral portion of the nozzle plate is formed to include an annular array of vent openings, located radially inboard of the seal, which vent openings communicate the interior of the container with the atmosphere and serve as a control on the value of the pressure in the container. The combined total area of such vent openings is less than the combined area of the steam jet forming nozzles. Preferably the vent openings discharge into an annular exhaust chamber which surrounds the steam chamber and has an outlet directly or indirectly in communication with the atmosphere. The conduit means for supplying steam to the steam chamber contains valve means which is selectively operable to either communicate the steam chamber with the steam source or alternatively with the atmosphere.

Another object of the present invention is to shorten the heat treatment time required for the sterilization step required in the canning of meats in hermetically sealed, heat-sterilized container. It is generally accepted that the exposure of such products to sterilizing heat for long periods of time impairs the organoleptic quality of the product as well as usually reducing its nutritional value. The reduction in exposure time needed to achieve the same results that are made possible by this invention lessens the impairment of the product. This time reduction applies in varying degrees to sterilizing systems that employ the conventional "batch" retorting—or pressure cooking—to continuous sterilizing systems that employ hydrostatic or continuous flow sterilizing cookers and to "fluidized bed" systems, such as the one disclosed in U.S. Patent No. 3,118,773, issued Jan. 21, 1964, to C. R. Bennett et al.

The principal reason for less exposure time being required to achieve sterilization of the product when the present invention is employed lies in the fact that the containers processed by this method enter the sterilizing environment at a temperature well above the ambient temperature employed in sterilizing most meat products. Also, with employment of the present invention, certain gases are evolved in the product and evacuated therefrom before final closure of the container and prior to sterilization. By conventional heat processing such gases are commonly produced within the closed container and tend to hinder the rate of heat penetration.

Another object of the present invention is to reduce or inhibit the sulfur staining of metal containers which occurs if the hydrogen sulfide released during the heat processing of proteinaceous foods reacts with the metal container to form sulfides. This stain is often deposited on the product in the container, detracting from its acceptability, and is generally thought to occur from the breakdown of sulfur compounds in the flesh of the species being canned when the product is exposed to heat. This invention provides for the evolvement and evacuation from the metal container of large quantities of hydrogen sulfide that would otherwise be produced in the closed container without possibility of escapement.

Another object of this invention is to provide the means during processing of injecting into the flesh being preserved certain desirable flavoring agents by having such agents entrained in the steam that is injected into the flesh during the practice of this invention. Illustrative of this is the mint flavoring of lamb flesh. During the steam injection process, a predetermined amount of mint extract is introduced into the steam supply at a point of its passage from source to filled container. This flavoring agent is carried by the steam into swift and deep penetration of the meat being processed. The amount of flavor is usually, but not necessarily, greater than that amount which would be commonly considered palatable. Thereafter, during the extraction step of this process, the excessive flavoring, if any, is reduced to a palatable level.

In summary, a principal object of this invention is to provide the means for improvement in the appearance, taste, odor and fat content of certain products or species where, more so that in others, the average amount and condition of free oil, along with the amount of free liquid, is often used as an indicator of quality and often affects the selling price of the canned flesh. Some of the species so affected are salmon, shad, sheefish, alewife (or river herring) and mackerel. It is a benefit of the use of this invention that the application of it to such species greatly reduces the amount of free and bound liquid and fat (oil) usually found in the flesh of many species and permits the return, in measured amounts, of either the same liquids and/or fat in refined form or such other liquid or fat as desired, to the flesh in each container where it can be readily absorbed into the interstices and spaces of the flesh due to the partially voided condition of the flesh immediately following exposure to a subatmospheric environment. Some of the fatty acids peculiar to some marine animals are unstable and reactive compounds and in some cases the final product is improved by removal of some of this fat—as well as the other ingredients mentioned above—and replacement, in some cases, of a more stable oil or fluid. In the case of some other species, the natural fat or oil is thought to be important to the flavor, odor, appearance, nutritional value and monetary value of the pack and therefore the retention of the oil in good condition is attempted. Because flesh for canning is not in uniformly the same condition, and because of the varying spoilage patterns that exist between species, the fat of some species is not in good condition at time of canning. This invention provides for the removal of substantial quantities of such fat and its replacement with fat (of the same species if preferred) that has been refined and restored to good condition. In many animal species the fat content can vary widely in various sections of the same skeleton. When such flesh is segmented and placed in various containers for preservation, this same fat content variation can be observed in equal amounts of flesh from the same animal in the several containers. It is a further benefit of this invention to enable the minimum quantities of fat, as well as the condition of such fat, to be predetermined for each container.

Another principal object of this invention is to provide the means whereby the very strongly flavored flesh of many wild and domesticated animals can be reduced to a flavor level that is commonly considered to be palatable. It is believed that this is accomplished during the practice of this invention by the reduction of the amount of volatile carbonylic compounds present in the edible fat of many species and by the reduction of volatile nitrogen and sulfur compounds that are produced when the flesh is heated.

The products resulting from use of this process have a very unusual and desirable flavor and odor, different from the flavor and odor of meats prepared by conventional processes. This difference extends to cases where the same species are being canned, one by this method and another by the conventional method.

As used herein, the term "fluids" means both liquids and gases.

These and other features, advantages, objects and capabilities of the present invention will be apparent from the following detailed description of the method of the present invention, and a preferred form of apparatus for use in performing certain steps of said method, taken together with the accompanying illustrations, wherein like numerals refer to like parts, and wherein:

FIG. 1 is a schematic view, or flow plan, diagrammatically illustrating the progress of a container of meat through the various stages or steps characterizing the method of this invention;

FIG. 2 is a partially schematic elevational view, with parts cut away, of a steam injection head according to this invention, the lower end of said head being concentrically related to an open top container that is substantially full of uncooked animal meat;

FIG. 3 is a view similar to FIG. 2, but showing the steam injection head and container in section and showing the container in a raised position, with its upper edge in engagement with an annular seal carried by the nozzle plate, such view showing the steam chamber in communication with a steam source, and depicting generally, by arrows, the flow pattern of the high velocity jets of steam into the uncooked animal meat and the path of some of the steam and evolved vapors and gases out from the container through the circular array of vent openings in the nozzle plate which communicate the interior of the container with the annular exhaust chamber surrounding the central steam chamber and discharging to the atmosphere;

FIG. 4 is a view like FIG. 3, but with the three-way valve rotated 90° so as to block off the steam supply conduit and communicate the steam chamber (and hence the interior of the container) with the atmosphere, such view depicting generally, by arrows, the outflow of the once confined steam, vapors and gases from the container through both the steam and exhaust chambers to the atmosphere;

FIG. 5 is an elevational view of the extraction head of a representative form of extraction machine usable in the performance of the process of this invention, in readiness to receive a container for extraction, with parts of said extraction head and said container being broken away for clarity of illustration;

FIG. 6 is a view similar to FIG. 5, but showing the extraction head and container in longitudinal section and the open top of the container raised into engagement with an annular seal carried by the inlet end portion of the extraction head;

FIG. 7 is a view like FIG. 6, but showing the extraction head and the container and its contents in an inverted position, with arrows being used to show generally the direction of pull of the vacuum;

FIG. 8 is a transverse sectional view of the steam injection head, taken substantially along line 8—8 of FIG. 3, presenting the nozzle plate in top plan;

FIG. 9 is an enlarged scale fragmentary sectional view, taken through a typical form of nozzle plate constructed according to the present invention, such form involving a relatively thick plate drilled or otherwise formed to include a plurality of substantially parallel, relatively narrow passageways, which constitute the nozzles for forming the steam into high velocity, deeply penetrating jets of fluid;

FIG. 10 is a view like FIG. 9 but of a modified form of nozzle plate, wherein the plate itself is relatively thin and carries a plurality of elongated, relatively small diameter tubes which constitute the nozzles;

FIG. 11 is a sectional view taken through the supporting hub and the valve plug of the extraction mechanism of FIGS. 5–7; and FIG. 12 is a schematic or flow plan view of a canning operation representing a typical manner of preserving the meat products of the invention subsequent to the removal therefrom of the undesirable flavor and spoilage influencing substances.

As diagrammatically illustrated in FIG. 1, the animal meat, which has been previously butchered, cleaned and cut into pieces, is taken from a source 10 and at a filling station 12 is suitably placed into open top containers C. Each container C is then moved from the filling station 12 to a high pressure and sub-cook heating station 14 whereat the temperature of the meat M, and the pressure in the container C on the meat M are both raised, preferably by injecting steam from a steam source 16 through the open top of the container C directly into the meat M while at the same time confining at least some of the steam and the vapors and gases from the meat, evolved as a result of the heating, in the container, as will be later explained in greater detail. After a suitable amount of time, the heating is discontinued and the pressure on the meat M is reduced to atmospheric pressure by releasing the steam and evolved vapors and gases from the container C. As will hereinafter be explained in more detail, the heat, pressure and sudden reduction of pressure all act to break down meat tissues and remove the barriers which they offer to the escape of flavor and spoilage influencing substances which are sealed in the meat cells and tissues. Next the meat is moved to a low pressure and extraction station 22 and while still hot is subjected to a vacuum from a source 24 by way of conduit means 26. The pressure in the container externally of the meat is lowered to a value substantially below atmospheric pressure. This creates a presure differential across the tissues of the meat since the liquids in the meat are still at or slightly above atmospheric pressure. As a result, these liquids (which are still hot) boil, and the vapors and gases which are evolved tend to break through and further tenderize the meat tissues. The container C is at least partially inverted when connected to the vacuum source so that substantially all of the loose liquids and free vapors and gases are removed or extracted from the meat M and removed from the container C. Finally the container C and its contents are moved to station 28 for preservation, as by canning, freezing, radiation treatment, etc. The preserved meat product MP is then ready for future use as a source of food.

The present invention will now be described in greater detail in conjunction with a canning operation, with specific reference being made to the remaining figures of the drawing.

In FIG. 2 an open top metal can C containing a species of uncooked animal meat, such as tunafish, for example, is shown supported on a pad 30 below the outlet end of a steam injection head 32, forming a part of the mechanism at station 14 (FIG. 1). As clearly shown in FIGS. 3 and 4, the steam injection head 32 comprises concentrically arranged inner and outer frusto-conical walls 34, 36 respectively, forming a central steam chamber 38 and an annular exhaust chamber 40 surrounding said steam chamber 38. The inlet end of the steam chamber 38 may be communicated through a three-way valve 42 with either conduit means 18 leading from the steam source 16 or vent passageway 20 leading to the atmosphere, by operator or automatic movement of the valve plug 44. The outlet end 46 of the exhaust chamber 40 is shown open to the atmosphere, but may be indirectly communicated to the atmosphere through conduit means. A nozzle plate 48 is provided at the lower end of steam injection head 32, as shown. As perhaps best shown in FIG. 8, the central portion of nozzle plate 48 (the portion within the confines of inner wall 34) is provided with a plurality of steam jet forming nozzles N designed to transform the steam into high velocity jets capable of penetrating swiftly and deeply into the interior of the meat M.

FIGS. 9 and 10 illustrate two typical forms which the nozzles may take. In FIG. 9, the nozzle plate 48 is shown as being relatively thick with the nozzles constituting relatively small diameter bores drilled or otherwise formed in the nozzle plate 48. In the form of FIG. 10, the nozzle plate 48' is substantially thinner, and the nozzles N' are individual nozzle tubes joined to or formed integral with the nozzle plate 48'. Such nozzle tubes are formed to include a central passageway of small diameter which function the same as the bores formed in the nozzle plate 48. A plurality of vent openings 50 are formed in the annular portion of nozzle plates 48 (or 48') and are disposed between inner wall 34 and outer wall 36. An annular gasket 52 of rubber or rubber-like material is provided at the lower side of nozzle plate 48, outwardly of the steam escape ports 50 and adjacent the portion of wall 36 extending below nozzle plate 48.

The steam injection head 32 is preferably stationary, and the can supporting pad 30 is preferably raiseable, as by a hand operated jack, for example, so that the lip at the upper edge of the can C can be put into sealing engagement with the gasket 52, as is shown in FIGS. 3 and 4.

In operation, an open top container C into which pieces of uncooked animal meat M have been previously placed is positioned on pad 30 below the steam injection head 32. Next the pad 30 is raised so as to place the upper lip of container C in sealing engagement with the gasket 52. Thereafter, valve plug 44, which up to this time has occupied the vent position illustrated in FIG. 4, is turned to the steam delivery position shown in FIG. 3. The steam which is at a pressure of about 50 p.s.i.g. enters into and fills the steam chamber 38 and is then transformed by the nozzles N into high velocity (e.g. 200 m.p.h. or more) needle-like steam jets. Owing to their high velocity, the steam jets penetrate quickly and deeply into the tissues and cells of the meat M, providing a quick and efficient heat-transfer. After traveling through the meat some of the steam, and also some of the vapors and gases which are evolved as a result of the meat being heated, leave the container C through the vent openings 50. The flow of steam into the container C through the nozzles N is much greater than the outflow of steam and evolved vapors and gases from the container C through the vent openings 50. This results in a nearly instantaneous buildup of pressure in the container C, which pressure is maintained as long as steam is being delivered. The vent openings 50 serve as pressure regulators and provide a control on the pressure in container C, preventing it from getting out of hand.

The heat and pressure combine to alter the tissue structure; bonds are broken and rings opened in the protein cells, with some dissociation and loss of structure. A general swelling of the tissues occurs, and this is accompanied by the translocation of some of the intramuscular fat from the endomysial and perimysial fat cells into the interstitial spaces of the meat. The blood is hemolized and there is a great degree of dispersion of extracellular tissue fluid throughout the muscle fiber and connective tissue. The structural balance of the tissue is disrupted generally and the environment that is favorable to the propagation of bacterial micro-organisms is disturbed. The saturated fats are elevated to temperatures above their melting points and the viscosity of the fats and tissue fluids is greatly reduced. Some of the liquid and fatty constituents of the meat are heated to temperatures approaching or beyond their point of vaporization.

As the next step of the process, the valve plug 44 is turned from the position illustrated in FIG. 3 to the position illustrated in FIG. 4. This stops the delivery of steam to steam chamber 38 and at the same time vents the vaporous and gaseous contents (including the steam) to the atmosphere, resulting in a relatively sudden reduction of the pressure on the meat down to atmospheric pressure. This sudden release of the meat from the effects of super-atmospheric pressure sets up further turbulence in the liquid constituent of the meat, causing an additional breakdown of the tissues. The internal pressure of the meat, including that of the liquid and fatty substances in the cells and tissues, is still substantially above atmospheric pressure. Thus, a pressure differential exists, and as a result the liquid and fatty substances in the meat boil and vaporize and then break through the tissues, causing their further breakdown. This continues until the internal pressure substantially equals the external pressure.

Next the pad 30 is lowered and the can C is moved directly to the extraction mechanism 22 whereat the meat M, while it is still hot and has cooled little, if at all, is subjected to a negative pressure or vacuum.

The extraction mechanism 22 is preferably like the one disclosed in and forming the subject matter of the Edward M. Borg and Robert McCarthy U.S. application Ser. No. 211,941, filed July 16, 1962, and entitled "Extraction Machine for Use in Meat Canning," now U.S. Patent No. 3,226,843, issued Jan. 4, 1966. However, the extraction mechanism disclosed in and forming the subject matter of the Edward M. Borg U.S. Patent No. 3,028,969, issued Apr. 10, 1962, and entitled "Extracting Machine for Use in Fish Canning," is also capable of performing the extraction step of the process provided by the present invention. For purposes of typical illustration, the extraction step will be described as being performed by a mechanism of the type disclosed in the said U.S. Patent No. 3,028,969, and to the extent necessary to a clearer understanding of the present invention, the disclosures of said U.S. Patent No. 3,028,969, and said Borg et al. application Ser. No. 211,941, are hereby expressly incorporated herein by reference.

Referring now to FIG. 5, and proceeding with a description of the method of the present invention, the open top can C of meat M is shown supported on a can lifting pad 54 below the outer end of an extracting head H. Each extracting head H comprises a cylindrical or tubular body portion 58 that is fixed relative to a turret T, radially thereof, by a supporting hub 60 of conical form that is fixed coaxially to the front face of the turret T. The inner end portion of the tubular body 58 is of reduced diameter and threads, in a vacuum sealed joint, into an opening 62 in the forward end portion of the hub 60. At its outer end the tubular body 58 is closed by a flat perforated plate 64 overlaid with a fine mesh screen 66, or some other suitable foraminous member. The diameter of the outer end portion of the tubular body 58 is such as to be snugly received within the open end of the can C (FIG. 6).

Closely adjacent its outer end, the tubular body 58 has a resilient gasket 68 of rubber or rubber-like material fitted thereto, and this is backed by a metal ring 70 slidably applied about the body 58 to yieldingly resist inward movement of the gasket. The ring 70 is backed by a coil spring 72, which surrounds the body 58, and at its inner end, seats against a metal ring 74 that is fixed about the body 58. This arrangement of parts provides that the outer end of the body 58 will enter the can and the gasket 68 will effect an air sealed connection with the lip of the can.

As is shown in FIG. 5, the body 58 is equipped within its restricted inner end portion with a butterfly valve 76 fixed on a rotatable valve stem 78 that extends through to one side of the body and is there equipped with a wheel 80. A link 82 is pivotally connected eccentrically at its outer end to this wheel as at 84, and at its inner end is pivotally attached as at 85 to the ring 70.

In operation, as the turret rotates from the bottom position shown in FIG. 5 the can pad 54 is raised by cam means including a cam ring CR and the upper lip of can C, disposed on said pad 54, is moved into sealing engagement with the gasket 68. The lifting of the can C by the cam pad 54 also slightly lifts the gasket 68 and ring 70 against the resistance afforded by the coil spring 72, causing the valve 76 to be slightly opened.

The source of vacuum comprises a closed liquid receptacle and vacuum tank 24 mounted on a base. Suitable vacuum is maintained within the tank by a vacuum pump connected therewith. By suitable conduit means 26 the closed liquid receptacle and vacuum tank 24 is put in communication with the opening 86 formed in supporting hub 88 (FIG. 7).

As the turret T continues to rotate, the inner end of the vacuumizing or extraction head H is caused to pass into registration with the vacuumizing opening 86 of supporting hub 60 and vacuum is applied through valve 76 to the can C. This effects the extraction of the loose liquids from the meat and causes the extracted liquids to flow through the opening 86 into the vacuum tank 24. With the full force of vacuum applied, the valve 76 is caused to be fully opened, whereby the can C is pulled away from the pad 54, as shown by FIG. 7, but held against displacement from the head H.

The application of vacuum has an additional effect. The interior of the container is subjected to a subatmospheric pressure at a time when the internal pressure of the meat, including that of the liquid and fatty flavor and spoilage substances still in the meat, is at or slightly above atmospheric pressure, and such meat is still hot. As a result, a new pressure differential is created and the vaporization temperature of the liqud substance is reduced, and such liquids begin to boil and burst through the tissues, causing still a further breakdown of the tissues (i.e. in addition to the breakdown of the tissues caused by the prior heating under pressure and sudden reduction of pressure).

In the arrangement illustrated, wherein the lip at the open end of the can C is in sealing engagement with the gasket 68 of the extraction head H, the loose liquids existing in the container will not be removed unless the extraction head is at least partially inverted.

With the passage of the extraction head H past the opening 86 in valve plug 88, the can C will be retained on the head H by vacuum pull until it arrives at a discharge point at which the vacuum in the extraction head H is fully relieved and releases the can. This relief of vacuum is effected by the passing of the inner end of the opening 62, in which the extraction head is threaded, into registration with a vent port 89 formed in the valve plug 88 and leading to the atmosphere.

As diagrammatically illustrated in FIG. 12, after leaving the extraction mechanism 22, the can C is moved on to the station 90 whereat oil, salt, vegetable extract and/or other seasonings or flavorings may be added to the can C after which said can C is passed through a clincher 92 and a seamer 94, and is then cooked and heat sterilized at station 96, and finally discharged as preserved meat product MP.

Although the method of the present invention has been specifically described in connection with a canning operation, it is to be understood that the particular manner of final preservation of the meat product is not critical, and any of the usual techniques of preserving food may be employed. Thus the product treated according to the present invention may be preserved by other techniques, as by freezing, ionizing radiation, or non-ionizing radiation, for example. The term "container" is used herein to mean any type of container found suitable to the various conventional methods of food preservation, and they may be of metal (i.e. "cans"), glass, plastic, treated paper, etc.

In further regards to preparation of the meat for extraction, it will be understood that the amount of applied heat and pressure will vary depending upon such factors as the density of the meat, the fat and average moisture content, the temperature of the meat, the capacity of the container, and the size shape, number and condition of the segments within the container, for example. Experiments have shown that best results are obtained when the tissue temperature of the meat being processed is brought to about 215° F. at its coolest point. It has also been found that flesh that is predominantly red tissue responds best to pressure in the range 40 to 50 p.s.i.g., while tissue that is not predominantly red responds best to pressures in the range 20–30 p.s.i.g. Experiments have further shown that predominantly red meat responds best to a vacuum of greater intensity and longer duration than does non-red tissue. Also, the vacuum time and intensity must be varied to accommodate containers of different sizes.

In the following illustrative examples, the flesh of five species of animals was processed according to this invention. In each case the process differs from the conventional methods (where one exists) of canning the same meat. In each case, following sterilization and cooling, the canned products were incubated for eight to ten days at a temperature of 131° F. Examination of the product following such incubation period revealed, in each case, that the product was equal or superior in appearance, odor and taste to the same or similar products canned by conventional means.

Example I.—Tunafish

Approximately seven ounces of Albacore tunafish, at a temperature of about 65° F., was filled into a metal container and exposed to steam heat of about 300° F. and at about 50 p.s.i.g. for a period of about 12 seconds. Immediately thereafter the meat filled, open top container was exposed to about 20″ Hg vacuum for a period of about 14 seconds. Next sterile water was added to the product, and the container was closed and sterilized in a steam retort for about 70 minutes at about 242° F.

This method of canning tunafish bears no resemblance to the conventional method of canning tunafish. Such conventional method is fully discussed in U.S. Patent No. 2,919,987, issued Jan. 5, 1960 to R. T. Erickson et al. The present invention eliminates the extensive pre-cooking and cooling of the tunafish, involved in the conventional method, and permits the canning of at least 50% more of the available tunafish as "solid" or "fancy" pack, and reduces or eliminates the necessity for "chunk," "flakes" or "grated" packs.

Example II.—Salmon (Chinook)

About eight ounces of Chinook salmon, at a temperature of about 65° F. was filled into a metal container and as before, was exposed to steam heat of about 320° F. at about 40 p.s.ig., for a period of about 10 seconds. Immediately thereafter the meat filled, top open container was exposed to about 25″ Hg vacuum for a period of 12 seconds. Then refined Chinook salmon oil was added and the container was closed and sterilized for about 65 minutes at 242° F., as before.

Compared to the conventional method of canning salmon—which is substantially the same as that set forth in Research Report No. 7, U.S. Department of Interior Fish and Wildlife Service, by Norman D. Jarvis, GPO 1943—the use of this process permits closer quality control, reduces or eliminates the off-odors and bitter taste frequently associated with canned salmon and permits the establishment of *minimum* fat content in each container of canned salmon.

The heating of proteinaceous flesh, such as salmon, produces among other things volatile sulphides. The production of sulphides in low concentrations probably contributes to the flavor of the product. However, such low or moderate concentrations appear possible only when the flesh of well nourished animals is processed for canning immediately after death. In contrast, when such flesh is kept in the best condition for even 24 postmortem hours, the heating process produces much higher concentrations of volatile sulphides, the objectionable chemistry of which tends to impair the flavor and appearance of the product. The flesh of animals in poor condition produces more unstable sulphur compounds than flesh from animals in good condition. By virtue of their life-cycle, salmon are uniformly in poorer condition than most other animals when they are caught for canning. Once salmon start out on their spawning migration they no longer feed, but depend upon stored-up body fat for nourishment. Because of this dependence upon their own body fat, salmon caught late in their migration period are poorer in quality and lower in food value than others. By present methods of canning salmon, the volatiles that derive from flesh such as salmon are evolved during heating after the can has been closed and therefore are provided with no escapement. In the canning technique of this invention, such volatiles are produced rapidly and uniformly, during the canning process, and are removed from the meat and the container before the container is closed, thus reducing them to an acceptable level. In the flesh of animals that have high concentrations of nitrogeneous products of an usually non-nutritive character the chemistry is somewhat different but the results are the same.

With regard to the oil (or fat) removed from the flesh of pink salmon, "pinks" are relatively low in fat content and, like in other species, the fat content can vary widely along the skelton, from tail to center to nape. In "pinks" there is a high conception of highly oxidative oil in the belly wall which militates against brine chilling since oil oxidizes more rapidly in the presence of salt. The light color and low fat content of pink salmon are probably the two most important factors (excepting only the supply of reds), affecting the ultimate market price. The process of this invention has little effect on the color of said fish, but it does improve and enhance the value of the fish in other vital respects, such as assuring uniform oil content, providing quality of oil content, and improving the odor, taste and general appearance of the pack.

As with other products, the fat removed from pinks during processing is passed through a caustic scrubber where sodium hydroxide strips the fatty acid contents, it is water washed and centrifuged, and is then added back to the product in measured quantity. This method of restoring fat to obtain first-class quality is easily and continuously done through the use of simple and relatively small equipment.

Example III.—Shark (*Squalus acanthias*—Grayfish)

About eight ounces of grayfish (Dogfish shark), at a tissue temperature of about 65° F., was filled into a metal container and exposed to steam at about 280° F., and at a pressure of about 20 p.s.i.g., for a period of about 16 seconds. Immediately thereafter, the meat filled, top open container was exposed to about 27" Hg vacuum for a period of about 16 seconds. Thereafter 3% brine was added to the product and the container was closed and sterilized for about 65 minutes at 242° F., as before.

The versatility of the present invention becomes more apparent when it is applied to the flesh of animals of elasmobranch species. This flesh evidences a spoilage pattern unlike that found in the flesh of most other species of mammal, which pattern contributes to the difficulty encountered in canning this species by the conventional heat methods. Elasmobranchii retain huge quantities of urea and trimethylamine oxide within their systems, often more than double the amount found in other species. Sterilizing heat required by conventional heat preservation methods causes decomposition of the urea, yielding unacceptable quantities of ammonia and carbon dioxide; and much of the trimethylamine oxide is reduced to trimethylamine. Previous known attempts to can this species have been unsuccessful or only partially successful. Canning of this species by the present invention has proved wholly successful and examination of the canned product after unusually prolonged exposure to incubation has revealed total absence of the ammoniacal nitrogen odor that is obvious in this species when conventional canning systems are employed.

Example IV.—Beef (utility grade)

About eight ounces of beef (utility grade), at a tissue temperature of about 65° F., was filled into a metal container and exposed to steam at about 320° F., and at about 50 p.s.i.g., for a period of about 12 seconds. Immediately thereafter the meat filled, top open container was exposed to about 24" Hg vacuum for a period of about 12 seconds. Thereafter sterile water was added to the product, and the container was closed and sterilized for about 70 minutes at about 242° F., as before.

Examination of this product revealed it to be of superior appearance, odor and taste when compared with the same product canned by conventional methods.

Example V.—Stellar sea lion (*Eumetopias jubata*)

About eight ounces of Stellar sea lion meat, at a tissue temperature of about 65° F., was filled into a metal container and exposed to steam at about 320° F., and at about 50 p.s.i.g., for a period of about 12 seconds. Immediately thereafter the meat filled, top open container was exposed to about 24" Hg vacuum for a period of about 12 seconds. Thereafter sterile water was added to the product, and the container was closed and sterilized for about 70 minutes at about 242° F., as before.

Examination of this product revealed it to be remarkably similar to beef and mutton canned by this system. Comparison with control packs of identical meat processed by the conventional "salmon method," and by the "open kettle beef method," indicated that the meat processed according to this invention did not have the objectionable sour-to-bitter flavor that was present in the control packs.

In each of the above examples the steam penetrated directly into the meat through the open top of the container. Also, the extraction step was performed substantially immediately following the release of steam, while the meat was still hot and had cooled little, if at all.

Further aspects of the invention involves substituting either microwave heating or ultrasonic intracellular-extracellular agitation in place of the heat-and-pressure by steam step.

Example VI—Tunafish (Albacore) microwave heated

About seven ounces of Albacore tunafish, at a temperature of about 65° F., was filled into a glass container and introduced into a microwave oven for a time sufficient for the product to achieve an internal temperature of about 240° F. (approximately 45 seconds). Immediately thereafter the product was transferred to a sterile metal container and exposed to about 20" Hg vacuum for a period of about 14 seconds. Thereafter sterile water was added to the product and the container was closed and sterilized for about 70 minutes at about 242° F. in a steam retort.

The microwave oven employed was of the commercial variety commonly used in restaurants for heating foods. As will be understood by those skilled in the art, glass containers must be used in microwave heating ovens. The transfer of the product from glass container to a metal container was for convenience and is not essential to the operation.

It was observed that this heating, at atmospheric pressure, seemed to accomplish a result similar to that achieved with the combined use of heat and pressure (by steam). During the extraction step it was observed that the extractive ability as well as the amount of fluid substance extracted approximately that obtained by the use of heat combined with pressure. Examination of the finished product indicated that it was of approximately the same values as that treated by the former method. It is assumed that this manner of accelerated heating causes the same or similar physiochemical phenomena that seems apparent in the operation of the preferred heat-pressure method.

Regarding intracellular-extracellular agitation by ultrasonic energy, depending on the intensity, the stimuli of ultrasonic energy will produce a response in living organisms capable of reaction and adaptation. Low intensities will prove to be sedative, medium intensities will prove to be stimulative, very high intensities may prove to be destructive. As will be apparent, destruction is a function of the product of time and intensity. It was found that when applied to chunk meat, the ultrasonic energy had an effect similar to combined heat and pressure; it made the liquid and/or fatty, flavor and spoilage influencing substances more amenable to extraction as loose fluids.

What is claimed is:

1. A method of removing undesirable flavor and spoilage influencing substances from uncooked animal meat, said method comprising:

placing pieces of said meat into an open top container;

introducing steam directly into the meat pieces, whereby the steam will rapidly enter and heat said meat pieces, while at the same time confining at least a portion of the steam and any evolved gases and/or vapors in the container, so as to also raise the pressure in the container, to disrupt the structural balance of the meat tissues and tend to render said undesirable substances amenable to later extraction as loose fluids, without cooking said meat pieces;

discontinuing the steam introduction while at substantially the same time releasing the steam and any evolved gases and/or vapors from the container, so as to lower the pressure in the container externally of the meat pieces so that hot liquid substances in the cells of the meat pieces which are still at an elevated pressure will boil and burst through the meat tissues and will then exist as loose liquids;

then, while the meat pieces are still hot, subjecting said meat pieces to a source of vacuum to lower the pressure in the container around the meat pieces to a value substantially below atmospheric pressure, so that further hot liquid substances still in and about the cells of the meat pieces, which are at or above atmospheric pressure, will boil and burst through the meat tissues, causing a further breakdown of said tissues; and extracting substantially all of the loose fluids from the meat pieces and the container.

2. The method of claim 1, wherein said steam is introduced into said meat pieces in the form of high velocity jets, so that said steam will rapidly enter and heat the meat pieces.

3. The method of claim 1, comprising subjecting the meat pieces to a source of vacuum by covering the open top of the container with a foraminous member in communication with a source of vacuum, and extracting the loose fluids by at least partially inverting the container and its contents while they are subjected to said vacuum, with the foraminous member securing to prevent gravitation of the meat pieces from the at least partially inverted container.

4. The method of claim 1, further comprising the step of cooking said meat pieces following completion of the steps enumerated in claim 3.

5. The method of claim 1, wherein steam is introduced until the internal temperature of the meat pieces is at least about 215° F. and the steam pressure is 20–50 p.s.i.g., and for a period less than the time required to cook the meat.

6. A method of removing undesirable flavor and spoilage influencing substances from uncooked animal meat, said method comprising:

injecting high velocity jets of steam directly into pieces of said meat while at the same time confining at least a portion of the steam and any evolved gases and/or vapors around the meat pieces, so as to heat the meat and raise the pressure in and on the meat pieces, to disrupt the structural balance of the meat tissues and tend to render said undesirable substances amenable to later extraction as loose fluids, without cooking said meat pieces;

discontinuing the steam introduction while at substantially the same time releasing the steam and gases and/or vapors from around the meat pieces, so that hot liquid substances in the cells of the meat pieces which are still at an elevated pressure will boil and burst through the meat tissues and will then exist as loose fluids;

then, while the meat pieces are still hot, subjecting said meat pieces to a source of vacuum to lower the pressure around the meat pieces a substantial amount below atmospheric pressure, so that further hot liquid substances still in and around the cells of the meat pieces, which are at or above atmospheric pressure, will boil and burst through the meat tissues, causing a further breakdown of said tissues; and with the aid of said vacuum, extracting substantially all of the loose fluids from and around the meat pieces.

7. A method of preparing meat, comprising:

introducing a gaseous pressurized palatable fluid directly into pieces of uncooked animal meat so as to raise the pressure in and on the meat pieces, to partially disrupt the structural balance of the meat tissues, without cooking said meat pieces;

discontinuing the pressurized gaseous fluid introduction;

releasing the gases and any vapors from around the meat pieces, so that liquid substances in the meat pieces which are still at elevated pressures will burst through the meat tissues due to the pressure differential which exists, causing a breakdown of said tissues and rendering said undesirable substances amenable to extraction in fluid form;

subjecting the meat to a source of vacuum to lower the pressure on and around the meat pieces to a value substantially below atmospheric pressure, so that liquids still in the meat and at substantially atmospheric pressure will burst through the meat tissues due to the pressure differential so created, causing an additional breakdown of the tissues; and with the aid of said vacuum, extracting all loose fluids from said uncooked animal meat.

8. The method of claim 7, further comprising the step of cooking said meat pieces following completion of the steps enumerated in claim 7.

9. A meat product prepared in accordance with a method including the steps of claim 8.

10. A method of processing and preserving tuna meat comprising:

placing pieces of uncooked tuna meat into a container in which such tuna meat is to be ultimately preserved;

introducing steam directly into the tuna meat pieces, whereby the steam will rapidly enter and heat said tuna meat pieces, while at the same time confining at least a portion of the steam and any evolved gases and/or vapors in the container, so as to also raise the pressure in the container, to disrupt the structural balance of the tuna meat tissues and tend to render undesirable flavor and spoilage influencing substances in the tuna meat pieces amenable to later extraction as loose fluids without cooking said tuna meat pieces;

discontinuing the steam introduction while at substantially the same time releasing the steam and any evolved gases and/or vapors from the container, so as to lower the pressure in the container externally of the tuna meat pieces so that hot liquid substances in the cells of the tuna meat pieces which are still at an elevated pressure will boil and burst through the tuna meat tissues and will then exist as loose fluids;

then, while the tuna meat pieces are still hot, subjecting said tuna meat pieces to a source of vacuum to lower the pressure in the container around the tuna meat pieces to a value substantially below atmospheric pressure, so that further hot liquid substances still in and about the cells of the tuna meat pieces, which are at or above atmospheric pressure, will boil and burst through the tuna meat tissues, causing a further breakdown of said tissues;

extracting substantially all of said loose fluids from the tuna meat pieces and the container; and closing the top of said container, cooking and preserving the tuna meat product in said container.

11. The preserved turna product prepared in accordance with a method including the steps of claim 10.

12. A method of processing and preserving salmon meat comprising:

placing pieces of uncooked salmon meat into a container in which said salmon meat is to be ultimately preserved;

introducing steam directly into said salmon meat pieces, whereby the steam will rapidly enter and heat said salmon meat pieces, while at the same time confining at least a portion of the steam and any evolved gases and/or vapors in the container, so as to also raise the pressure in the container, to disrupt the structural balance of the salmon meat tissues and tend to render undesirable flavor and spoilage influences substances in the salmon meat pieces, including sulphide volatiles, amenable to later extraction as loose fluids, without cooking said salmon meat pieces;

discontinuing the steam introduction while at substantially the same time releasing the steam and any evolved gases and/or vapors from the container, so as to lower the pressure in the container externally of the salmon meat pieces so that hot liquid substances in the cells of the salmon meat pieces which are still at any elevated pressure will boil and burst through the salmon meat tissues and will then exist as loose fluids;

then, while said salmon meat pieces are still hot, subjecting said salmon meat pieces to a source of vacuum to lower the pressure in the container around the salmon meat pieces to a value substantially below atmospheric pressure, so that further hot liquid substances still in and about the cells of the salmon meat pieces, which are at or above atmospheric pressure, will boil and burst through the salmon meat tissues, causing a further breakdown of said tissues;

with the aid of said vacuum extracting from said salmon meat pieces and said container evolved sulphide volatiles and other loose fluids; and closing the top of said container, cooking and preserving the resulting salmon meat product in said container.

13. The method of claim 12, further comprising adding a refined food oil to said salmon meat pieces prior to closing the container, to replace extracted oils.

14. The salmon meat product prepared in accordance with a method including the steps of claim 13.

References Cited

UNITED STATES PATENTS

| | | | |
|---|---|---|---|
| 1,252,865 | 1/1918 | Thompson | 99—188 X |
| 2,308,601 | 1/1943 | Gentele. | |
| 2,331,266 | 10/1943 | Cramer | 99—107 |
| 2,411,188 | 11/1946 | Borg | 99—188 |
| 2,912,330 | 11/1959 | Hawk et al. | 99—107 X |
| 2,980,537 | 4/1961 | Hagen | 99—107 |
| 3,028,969 | 4/1962 | Borg. | |
| 3,271,169 | 9/1966 | Baker et al. | |

HYMAN LORD, Primary Examiner

U.S. Cl. X.R.

99—111, 157, 158, 187, 188